US008717966B2

(12) United States Patent
Wang et al.

(10) Patent No.: US 8,717,966 B2
(45) Date of Patent: May 6, 2014

(54) SYMMETRICAL COOPERATIVE DIVERSITY IN THE RELAY-ENABLED WIRELESS SYSTEMS

(75) Inventors: Shu-Shaw (Peter) Wang, Arlington, TX (US); Tony Reid, Plano, TX (US); Marilynn Green, Coppell, TX (US)

(73) Assignee: Nokia Siemens Networks Oy, Espoo (FI)

( * ) Notice: Subject to any disclaimer, the term of this patent is extended or adjusted under 35 U.S.C. 154(b) by 1238 days.

(21) Appl. No.: 12/071,153

(22) Filed: Feb. 15, 2008

(65) Prior Publication Data

US 2009/0207778 A1 Aug. 20, 2009

(51) Int. Cl.
  *H04B 7/14* (2006.01)
  *H04W 88/04* (2009.01)
  *H04B 7/185* (2006.01)
  *H04W 72/00* (2009.01)
  *H04W 48/20* (2009.01)

(52) U.S. Cl.
  CPC ........... *H04W 88/04* (2013.01); *H04B 7/18523* (2013.01); *H04W 72/005* (2013.01); *H04W 48/20* (2013.01)
  USPC ......... 370/315; 375/262; 455/552.1; 714/772

(58) Field of Classification Search
  CPC ....................................................... H04B 7/14
  USPC ......... 370/338, 348, 328, 329, 350, 254, 248, 370/249, 327; 455/422.1, 426.2, 433, 434, 455/435.1, 432.2, 432.3, 449, 453
  See application file for complete search history.

(56) References Cited

U.S. PATENT DOCUMENTS

| | | | |
|---|---|---|---|
| 7,173,961 B2 * | 2/2007 | Vadde | 375/219 |
| 7,673,219 B2 * | 3/2010 | Molisch et al. | 714/772 |
| 7,684,337 B2 * | 3/2010 | Mehta et al. | 370/238 |
| 7,778,598 B2 * | 8/2010 | Devroye et al. | 455/13.4 |
| 2005/0255808 A1 | 11/2005 | Ahmed et al. | |
| 2006/0223574 A1 * | 10/2006 | Chandra | 455/552.1 |
| 2007/0165581 A1 | 7/2007 | Mehta et al. | |
| 2007/0217537 A1 | 9/2007 | Berenguer et al. | |
| 2008/0247478 A1 * | 10/2008 | Lee et al. | 375/260 |
| 2009/0129496 A1 * | 5/2009 | Zhang et al. | 375/262 |

OTHER PUBLICATIONS

International Search Report, PCTUS2009/000948 dated Apr. 3, 2009.

* cited by examiner

*Primary Examiner* — Ian N Moore
*Assistant Examiner* — Brian T Le
(74) *Attorney, Agent, or Firm* — Squire Sanders (US) LLP

(57) ABSTRACT

A communications system includes a source, a destination, and multiple relays. In a first time period, the source emits a first transmission and a first relay retransmits a prior source transmission. Then, in a second, subsequent time period, the source node emits a second transmission and a second relay transmits the source transmission from the first time period. Optionally, the transmission from the second relay also includes the message from the first relay during the first time period. Similarly, in a third time period, the first relay transmits a message that includes the second relay's transmission and the second source transmission from the second time period. Alternatively, the source node transmit in a first frequency band, the first and second relays receive only in the first frequency band, and retransmit in a second frequency band, and the destination receives in both the first and second frequency bands.

19 Claims, 10 Drawing Sheets

SYMMETRICAL COOPERATIVE DIVERSITY IN THE RELAY-ENABLED WIRELESS SYSTEMS

BACKGROUND OF THE INVENTION

1. Field of the Invention

The present application generally relates to a system and method for providing a wireless system having multiple relays with coordinated operation.

2. Description of the Related Art

A Wireless Distribution System (WDS) is a system that enables the wireless interconnection of access points (AP) in an IEEE 802.11 network. The WDS allows a wireless network to be expanded using multiple access points without the need for a wired backbone to link them, as is conventionally required. The notable advantage of WDS over other solutions is that it preserves the MAC addresses of client packets across links between access points. An access point can be either a main, relay or remote base station. A main base station is typically connected to the wired Ethernet. A relay base station relays data between remote base stations, wireless clients or other relay stations to either a main or another relay base station. A remote base station accepts connections from wireless clients and passes them to relay or main stations. Connections between clients are made using MAC addresses rather than by specifying IP assignments. Typically, nodes in WDS are configured to use the same radio channel. The WDS can be configured to different service set identifiers.

The nodes in a WDS may bridge wireless clients. It should be noted, however, that throughput in this method is traditionally inversely proportional to 2 raised to the power of the number of hops, since all traffic uses the same channel. For example, client traffic going through one relay station before it reaches the main access point in conventional system will see at most half the maximum throughput that a directly connected AP would experience, and a client two hops from the directly connected AP will see at most one quarter of the maximum throughput seen at the directly connected AP. In response to this bandwidth problem, a source node and a relay node may transmit concurrently, and a destination node may be adapted to interpret the combined signals. However, this configuration, as described in greater detail below, also suffers from limitations.

At the same time, wireless communications systems, such as a WDS, typically operate over comparatively short ranges. These limitations in distance are caused by multiple factors. For example, the allowed signal strengths of wireless transmissions are typically low to reduce potential public health risks from the electro-magnetic radiation and to minimize interference with other transmissions. Furthermore, wireless communications typically require substantially line-of-site access between a transmitter and receiver, such that an intermediate structure may block or otherwise attenuate the transmission sufficiently to degrade communications.

Thus, it is known in conventional systems to expand the coverage of a wireless communications network by adding a relay node. However, as described in greater detail below, the conventional relay configuration result in sub-optimal performance due to factors, such as non-uniform signal amplification.

SUMMARY OF THE INVENTION

In response to these and other needs, embodiments of the present application provide a communications system that includes a source, a destination, and multiple relays. In a first time period, the source emits a first transmission and a first relay retransmits a prior source transmission. Then, in a second, subsequent time period, the source node emits a second transmission and a second relay transmits the source transmission from the first time period. Optionally, the transmission from the second relay also includes the message from the first relay during the first time period. Similarly, in a third time period, the first relay transmits a message that includes the second relay's transmission and the second source transmission from the second time period. Alternatively, the source node transmit in a first frequency band, the first and second relays receive only in the first frequency band, and retransmit in a second frequency band, and the destination receives in both the first and second frequency bands.

In another embodiment, the present application provides a method for relaying transmissions between a source node and a destination node in wireless network. The method includes a destination node receiving a first broadcast comprising a first source transmission from the source node and a first relay transmission from a first relay node, whereby the first relay transmission includes a prior source transmission received from the source node. The destination node then receives a second broadcast that includes a second source transmission from the source node and a second relay transmission from a second relay node, whereby the second relay transmission includes the first source transmission. The destination node then decodes the first and second broadcasts. Optionally, the decoding includes using a linear minimum mean square error decision feedback equalizer receiver to detect transmitted data symbols.

In one implementation, the second relay transmission further includes the first relay transmission. Likewise, the destination node in a third time period receives a third broadcast including a third source transmission from the source node and a third relay transmission from the first relay node, whereby the third relay transmission includes the second source transmission and the second relay transmission. In this way, a relay node during any of the time period rebroadcasts all symbols received from the source node during all prior time periods. Alternatively, the first and second source transmission are in a first frequency band, and the first relay and the second relay transmissions are in a second frequency band, whereby the relays are configured to listen in the first frequency band and to transmit in the second frequency band.

Thus, embodiments of the present application provide a destination node for receiving relayed transmissions from source node. This destination node includes a receiver configured to receive a first broadcast including a first source transmission from the source node and a first relay transmission from a first relay node, whereby the first relay transmission includes a prior source transmission received from the source node. The receiver is further configured to receive a second broadcast that includes a second source transmission from the source node and a second relay transmission from a second relay node, whereby the second relay transmission includes the first source transmission. Optionally, the destination node includes a processor configured to decode the first and second broadcasts. Optionally, this processor includes a linear minimum mean square error decision feedback equalizer receiver to detect transmitted data symbols.

Optionally, in the destination node, the second relay transmission further includes the first relay transmission. Similarly, the receiver may be configured to receive a third broadcast including a third source transmission from the source node and a third relay transmission from the first relay node, whereby the third relay transmission includes the second source transmission and the second relay transmission.

Alternatively, the first and second source transmissions include a first frequency band, and the first relay and the second relay transmissions include a second frequency band. Thus, the relays are configured to listen in the first frequency band and to transmit in the second frequency band.

In another embodiment, a provided method for relaying a message from a source node to a destination node includes a relay node receiving a first broadcast including a first source transmission from the source node, and then transmitting a second relay transmission that includes the first source transmission. Meanwhile, the destination node receives a first broadcast and second broadcast, and this first broadcast includes the first source transmission from the source node and a first relay transmission from another relay node. The first relay transmission includes a prior source transmission received from the source node. The second broadcast includes a second source transmission from the source node and the second relay transmission. Optionally, the destination node includes a linear minimum mean square error decision feedback equalizer receiver to detect transmitted data symbols.

The second relay transmission further optionally includes the first relay transmission. Similarly, the destination node may further receive a third broadcast that includes a third source transmission from the source node and a third relay transmission from the relay node, whereby the third relay transmission includes the second source transmission and the second relay transmission.

The first and second source transmission may be transmitted in a first frequency band, and the first relay and the second relay transmissions may be transmitted in a second frequency band. The relays may be configured to listen and receive messages sent in the first frequency band and but to transmit only in the second frequency band. In this way, the relays would not communicate with one another because they would not listen in the second frequency band.

A relay node for relaying a message from a source node to a destination node, the relay node may include a receiver configured to receive a first broadcast including a first source transmission from the source node, and transmitter configured to transmit a second relay transmission, whereby the second relay transmission includes the first source transmission. In this configuration, the destination node receives a first broadcast and second broadcast, whereby the first broadcast includes the first source transmission from the source node and a first relay transmission from a relay node, where the first relay transmission includes a prior source transmission received from the source node. Similarly, the second broadcast includes a second source transmission from the source node and the second relay transmission. Optionally, the destination node includes a linear minimum mean square error decision feedback equalizer receiver to detect transmitted data symbols.

In one implementation, the relay node is configured to produce the second relay transmission using the first relay transmission. In this way, the retransmissions include the prior transmissions from the source node. For example, the second relay transmission may further include the first relay transmission. Similarly, during a third time period, the receiver may be configured to receive a third broadcast including a third source transmission from the source node. The third broadcast further includes a third relay transmission from the relay node, whereby the third relay transmission includes the second source transmission and the second relay transmission.

Alternatively, the first and second source transmission again may be transmitted in a first frequency band, and the first relay and the second relay transmissions again may be transmitted in a second frequency band. Thus, the relays may be configured to listen and receive messages sent in the first frequency band and but to transmit only in the second frequency band. In this way, the relays would not communicate with one another because they would not listen in the second frequency band.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

In cooperative relaying, a relay R processes received signals from a source S and to retransmit to a destination D by means of AF (amplify-and-forward) or DF (detection-and-forward) modes. Typically, the relay R receives a transmission from the source in a first time cycle, and then rebroadcasts the received transmission in a second, subsequent time cycle.

Figure 1:
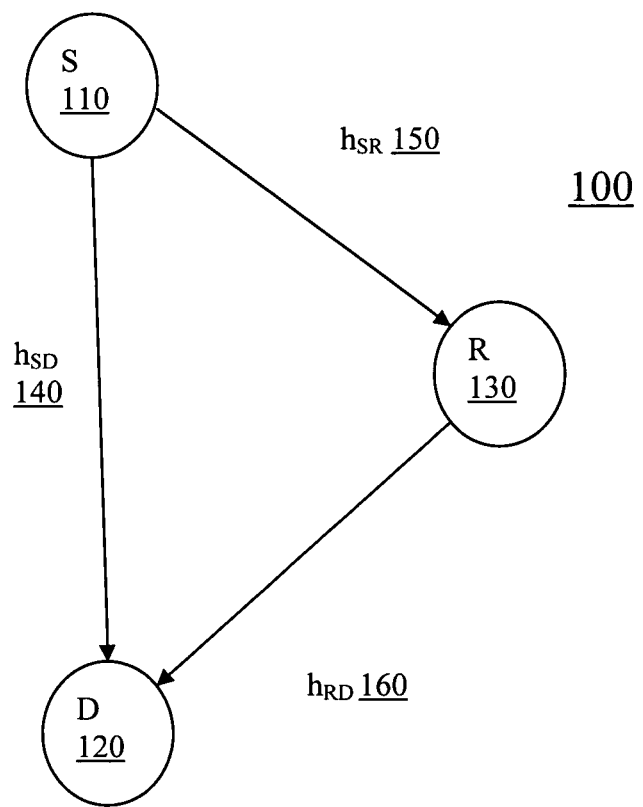
FIG. 1. (prior art) is a high-level, schematic depiction of a conventional relaying system that uses a single relay.

Cooperative diversity is conventional cooperative relaying strategy to provide diversity gain to the system without increasing transmission time or transmission bandwidth. Referring now to FIG. 1 (Prior Art), a cooperative diversity system 100 has a source S 110, a destination D120, and a single relay R 130 with single antenna transmitter and receiver (or transceiver). As depicted in FIG. 1, an information source S 110 and a destination D 120 communicate to each other either directly from S 110 to D 120 via a transmission $h_{SD}$ 140 or through an indirect relay station R 130 to the destination D 120 via transmissions $h_{SR}$ 150 and $h_{RD}$ 160. The cooperative diversity system 100 of FIG. 1 can support one symbol transmission per time slot (i.e., full rate transmission). Thus, the relay 130 generally only receives or transmits one symbol at a time.

Figure 2:
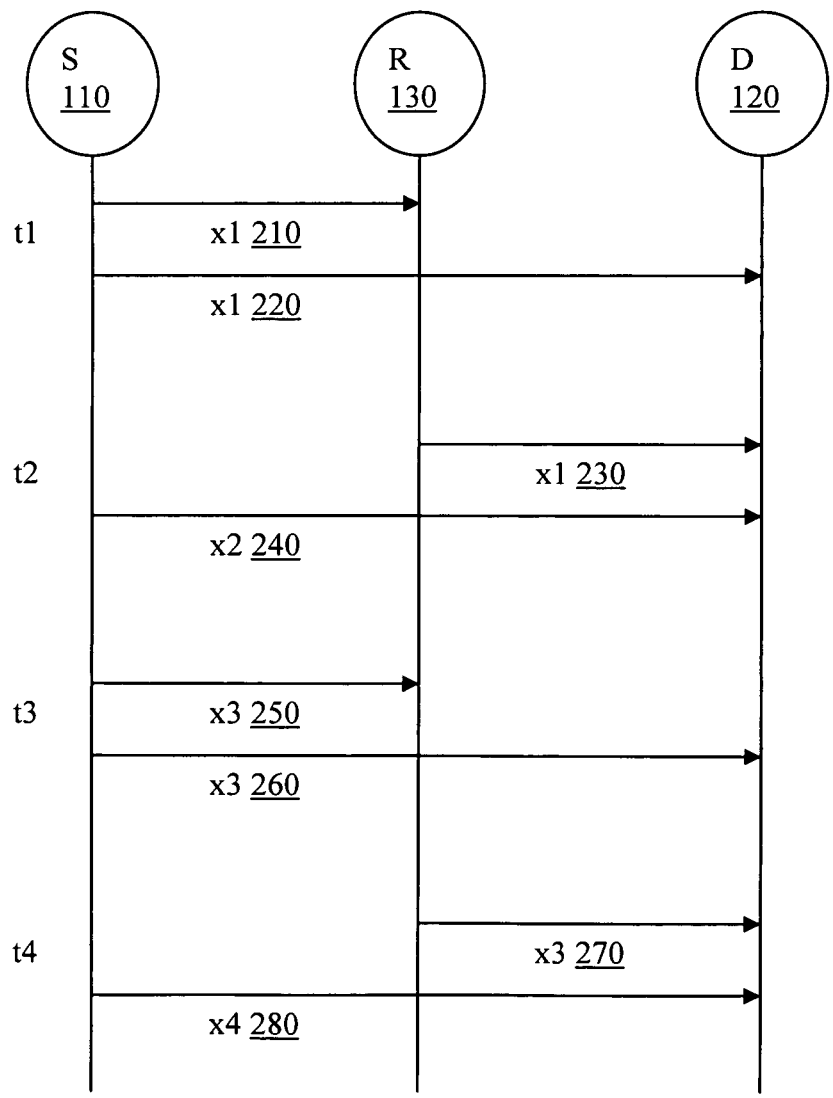
FIG. 2. (prior art) is a process flow diagram that depicts the message transmission in the relaying system of FIG. 1.

However, as a consequence, the cooperative diversity system 100 provides non-symmetrical transmissions for different data symbols, as depicted in process flow 200 of FIG. 2.

As depicted in FIG. 2, at time period t1, the source 110 broadcasts a symbol $x_1$. The broadcast symbol $x_1$ is received by both the relay 130 and the destination 120 as transmissions 210 and 220.

Continuing with FIG. 2, at the next time period t2, the source 110 broadcasts a second symbol $x_2$. The broadcast symbol $x_2$ is received by the destination 120 as transmission 240. Also during period t2, the relay 120 rebroadcasts the symbol $x_1$ (previously received during the prior period t1) as transmission 230. The broadcast symbol $x_2$ is not received by the relay 130 because it is otherwise occupied with the retransmission of symbol x1 in transmission 230.

Likewise, at time period t3, the source 110 broadcasts a symbol $x_3$ that is received by both the relay 130 and the destination 120 as transmissions 250 and 260. Then, at the next time period t4, the source 110 in transmission 280 broadcasts another symbol $x_4$ to the destination 120. Also during this period t4, the relay 120 rebroadcasts the symbol $x_3$ (previously received during the prior period t3) as transmission 270. Again, as with symbol $x_2$ in time period t2, the broadcast symbol $x_4$ is not received by the relay 130 in time period t4 because the relay is occupied with the retransmission of symbol x3 in transmission 270 during that period.

Thus, the $x_2$ symbol and the $x_4$ symbol are only transmitted from once in the path 140 from the source 110 to the destination terminal 120, and consequently a diversity gain is not applied to these symbols that are now retransmitted by the relay 130. Therefore, the error rates of two symbols, such as $x_1$ and $x_2$, may be different due to the difference in the diversity gain applied to each received data symbol.

The data symbol $y_1$ received at the destination during the time slot $t_1$ may be given in Equation 1:

$$y_1 = h_{SD} x_1 + n_1. \quad \text{(Eq. 1)}$$

Similarly, the data symbol $y_1'$ received at the relay during that time slot $t_1$ is given as Equation 2:

$$y_1' = h_{SR} x_1 + n_1' \quad \text{(Eq. 2)}$$

where $n_1$ and $n_1'$ are additive white Gaussian noise with $N \sim (0, \sigma^2)$. The variable $h_{SD}$ is the equivalent channel between source S 110 and destination D 120. The variable $h_{SR}$ is the equivalent channel between source S 110 and the relay R 130. The modulated data symbols satisfy the condition that $E\{\|x_i\|^2\}=1$ for i=1, 2.

The relay normalizes the received data symbol by a factor $\beta$, as follows in Equation 3:

$$\beta = \sqrt{\frac{1}{|h_{SR}|^2 + \sigma^2}}. \quad \text{(Eq. 3)}$$

This factor $\beta$ is used in order to normalize the average energy to unity before the relay R 130 forwards the symbol in time slot $t_2$.

As a result, the destination receives the superimposed signals from the relay node and the source node during time slot $t_2$ as provided in Equation 4:

$$y_2 = h_{SD} x_2 + \beta h_{RD} h_{SR} x_1 + \tilde{n} \quad \text{(Eq. 4)}$$

where $\tilde{n} = h_{RD} \beta n_1' + n_2$ and $h_{RD}$ is the equivalent channel between relay R 130 and destination D 120.

In summary, the effective input-output relation for a single relay cooperative scheme in AF mode is given by Equation 5:

$$y = H_a x + n \quad \text{(Eq. 5)}$$

where $y=[y_1 \ y_2]^T$ is the received data symbol vector.

An equivalent channel matrix, $H_a$, is obtained in Equation 6 as:

$$H_a = \begin{bmatrix} h_{SD} & 0 \\ \beta h_{SR} h_{RD} & h_{SD} \end{bmatrix}, \quad \text{(Eq. 6)}$$

where $x=[x_1 \ x_2]^T$ is the transmitted data symbol vector where $E\{\|x_1\|^2\}=E\{\|x_2\|^2\}=1$, and $n=[n_1 \ \tilde{n}]^T$ is the received noise vector.

A linear minimum mean square error (MMSE) receiver may be used to detect the transmitted data symbols according to Equation 7:

$$x = (H_a^H H_a + I\sigma^2)^{-1} H_a^H y \quad \text{(Eq. 7)}$$

If the DF mode is applied, only the equivalent channel matrix, $H_a$ from Equation 6 is simplified as shown in Equation 6':

$$H_a = \begin{bmatrix} h_{SD} & 0 \\ h_{RD} & h_{SD} \end{bmatrix}. \quad \text{(Eq. 6')}$$

All the other equations used in DF mode are the similar to those as described in the AF mode, as described above Equations 1-7.

Thus, the cooperative relaying, such as the system 100, is relatively simple, but provides an unbalanced diversity gain to the received data symbols, as described above.

In order to provide a balance diversity gain to all the received data symbols, embodiments of the present application provide a symmetrical cooperative relaying scheme that overcomes the above described non-symmetry transmission for different data symbols in the conventional cooperative relaying.

Figure 3:
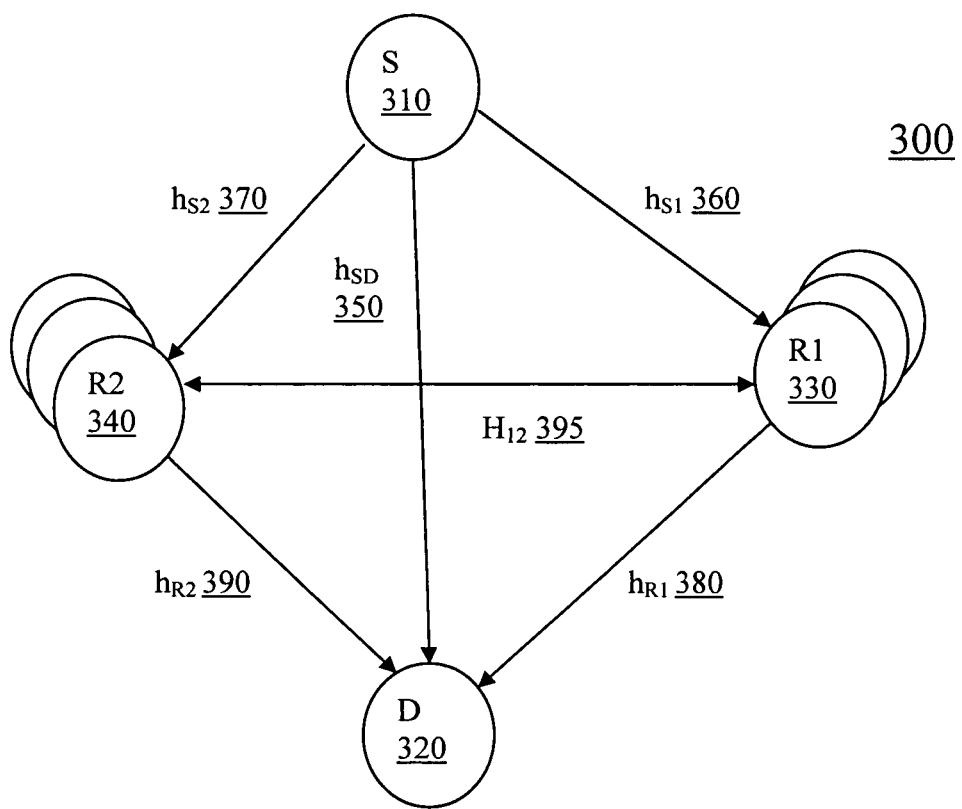
FIG. 3. is a high-level, schematic depiction of a cooperative relaying system in accordance with embodiments of the present application.

Referring now to FIG. 3, a symmetrical cooperative relay system 300 includes a source S 310, a destination D 320, and a pair of relay stations as $R_1$ and $R_2$, nodes 330 and 340. As described below, a symmetrical cooperative relay system 300 provides full data transmission rate and symmetry diversity to each transmitted data symbol. Since the relay stations 330 and 340 are communicating with each other, this kind of cooperative relaying can be described herein as "full cooperation." In particular, in this embodiment of the present application, the relay stations 330 and 340 alternate between first receiving signals from the source 310 and the other relay stations 330 and 340 and then retransmitting the received signals. In particular, as described below in the discussion of the process flow 400 of FIG. 4, an exemplary data symbol transmission in the symmetrical cooperative relay system 300 indicates that, at any time slot, the destination 320 receives the current transmitted symbol as well as all the accumulated signals from previous relay collaborations.

Continuing with the symmetrical cooperative relay system 300 of FIG. 3, the information source S 310 and the destination D 320 communicate to each other either directly via a transmission $h_{SD}$ 350 or via transmissions $h_{S1}$ 360 and $h_{1D}$ 370 through the first relay R1 330 or transmission $h_{S2}$ 380 and $h_{2D}$ 390 through the second relay R2 340. the information source S 310 and the destination D 320 communicate to each other either directly via a transmission $h_{SD}$ 350 Due to this cooperation between the relays 330 and 340, the symmetrical cooperative relay system 300 of FIG. 3 can support one symbol transmission per time slot (i.e., full rate transmission) and the relays 330 and 340 may receiver or transmit multiple symbol at a time.

Figure 4:
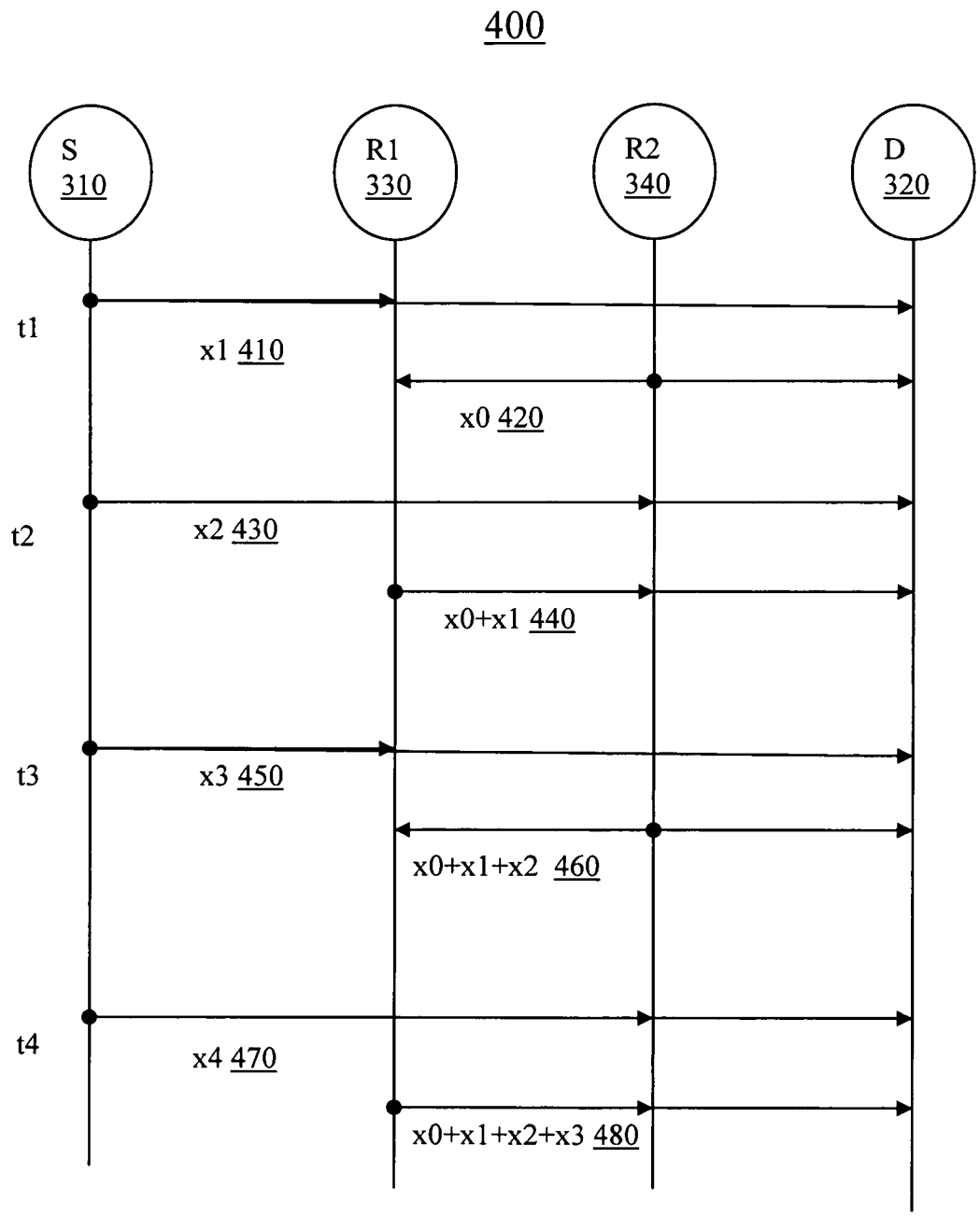
FIG. 4. is a process flow diagram that depicts the message transmission in the relaying system of FIG. 3.

Referring to FIG. 4, the source S 310 transmits the full rate data symbol to the destination D 320, in transmission 410, 430, 450, and 470 that are associated with, respectively, time periods $t_1$, $t_2$, $t_3$, and $t_4$. At time $t_1$, the second relay $R_2$ 340 is transmitting whatever ($x_0$) was received during the previous time epoch $t_0$, while the first relay $R_1$ 330 is listening to the transmission 410 of $x_1$ from the source S 310 and the transmission 420 ($x_0$) from the second relay $R_2$ 340. Then, at time $t_2$, the first relay $R_1$ 330 retransmits signals 410 and 420 ($x_0+x_1$) received during the previous time slot $t_2$, and the second relay $R_2$ receives the transmission 430 ($x_2$) from the source S 310 and the transmission ($x_0+x_1$) from first relay $R_1$ 330. This process similarly repeats during time periods $t_3$, $t_4$, and subsequent periods with transmissions 460 and 480 in which, respectively, the second relay $R_2$ 340 or the first relay $R_1$ 330 rebroadcasts transmissions received from a prior time period.

The exemplary detailed transmission and receiver protocols for this cooperative relaying scheme are shown in table 1.

For AF mode, the mathematical representation of the system model is given by Equations 8a and 8b:

$$y(2k-1)=h_{SD}(2k-1)\cdot x(2k-1)+\alpha_{2D}\cdot h_{2D}(2k-1)\cdot \beta_{R2}(2k-2)\cdot x_{R2}(2k-2)+n_D(2k-1) \quad \text{(Eq. 8a)};$$

$$y(2k)=h_{SD}(2k)\cdot x(2k)+\alpha_{1D}\cdot h_{1D}(2k)\cdot \beta_{R1}(2k-1)\cdot x_{R1}(2k-1)+n_D(2k) \quad \text{(Eq. 8b)},$$

where $x_{R1}(2k-1)$ and $x_{R2}(2k-2)$ are the signals received by relay $R_1$ at time slot $2k-1$ and relay $R_2$ at time slot $2k-2$ respectively. $\alpha_{1D}=\sqrt{(d_{1d}/d_{SD})^{-n}}$ is the normalized path loss coefficient from the relay $R_1$ to the destination D with respect to the distance $d_{SD}$, $\alpha_{2D}=\sqrt{(d_{2D}/d_{SD})^{-n}}$ is the normalized path loss coefficient from relay $R_2$ to the destination D, and n is the pass loss exponent. The equation of $\beta_{R1}(2k-1)=1/\sqrt{E\{\|x_{R1}(2k-1)\|^2\}}$ corresponds to the factor that the relay $R_1$ normalizes its received data symbol in order to make the average energy be equal to unity when it amplifies and forwards its signal to the next stage. Similarly, $\beta_{R2}(2k-2)=1/\sqrt{E\{\|x_{R2}(2k-2)\|^2\}}$ is the factor that the relay station $R_2$ normalizes its received data symbol in order to make the average energy is unity when it amplifies and forwards its signal to the next stage. In general, $h_{xx}$ defines the channel state information defined as zero-mean, complex Gaussian random variables. Also, the variable $n_D$ corresponds to the additive white Gaussian noise (AWGN) at the destination.

These signals of $x_{R1}(2k-1)$ and $x_{R2}(2k-2)$ are defined in Equations 9a and 9b:

$$x_{R2}(2k-2)=\alpha_{S2}\cdot h_{S2}(2k-2)\cdot x(2k-2)+\alpha_{12}\cdot h_{12}(2k-2)\beta_{R1}(2k-3)\cdot x_{R1}[2k-3]+n_{R2}[2k-2] \quad \text{(Eq. 9a)},$$

$$x_{R1}(2k-1)=\alpha_{S1}\cdot h_{S1}(2k-1)\cdot x[2k-1]+\alpha_{12}\cdot h_{12}(2k-1)\cdot \beta_{R2}(2k-2)\cdot x_{R2}(2k-2)+n_{R1}(2k-1) \quad \text{(Eq. 9b)}.$$

Similarly as previously defined, the variable $\alpha_{S1}=\sqrt{(d_{S1}/d_{SD})^{-n}}$ is the normalized path loss coefficient from the source to relay $R_1$, the variable $\alpha_{S2}=\sqrt{(d_{S2}/d_{SD})^{-n}}$ is the normalized path loss coefficient from the source to relay $R_2$, the variable $\alpha_{12}=\sqrt{(d_{12}/d_{SD})^{-n}}$ is the normalized path loss coefficient from relay $R_1$ to relay $R_2$, and n is the pass loss exponent. The equation of $\beta_{R1}(2k-3)=1/\sqrt{E\{\|x_{R1}(2k-3)\|^2\}}$ provides the factor that relay $R_1$ uses in order to normalize its received data symbol in order to make the average energy become unity when it amplifies and forwards its signal to the next stage.

In order to model the system in matrix form, the following values are set in Equations 10-14:

$$Y[k] = \begin{bmatrix} y(2k-1) \\ y(2k) \end{bmatrix}, \quad \text{(Eq. 10)}$$

$$X[k] = \begin{bmatrix} x(2k-1) \\ x(2k) \end{bmatrix}, \quad \text{(Eq. 11)}$$

$$X_R[k] = \begin{bmatrix} x_{R2}(2k-2) \\ x_{R1}(2k-1) \end{bmatrix}, \quad \text{(Eq. 12)}$$

$$\tilde{n}_D[k] = \begin{bmatrix} n_D(2k-1) \\ n_D(2k) \end{bmatrix}, \text{ and} \quad \text{(Eq. 13)}$$

$$\tilde{n}_R[k] = \begin{bmatrix} n_{R2}(2k-2) \\ n_{R1}(2k-1) \end{bmatrix}. \quad \text{(Eq. 14)}$$

TABLE 1

Transmission and receiving protocol for the symmetrical cooperative relaying system.

| | Time index 2k − 1 (odd) | Time index 2k (even) |
|---|---|---|
| S (sending) | x(2k − 1) | x(2k) |
| $R_1$ | $x_{R1}(2k-1) = \alpha_{S1} \cdot h_{S1}(2k-1) \cdot x(2k-1) + \alpha_{12} \cdot h_{12}(2k-1) \cdot \beta_{R2}(2k-2) \cdot x_{R2}(2k-2) + n_{R1}(2k-1)$ (receiving) | $x_{R1}(2k-1)$ (sending) |
| $R_2$ | $x_{R2}(2k-2)$ (sending) | $x_{R2}(2k) = \alpha_{S2} \cdot h_{S2}(2k) \cdot x(2k) + \alpha_{12} \cdot h_{12}(2k) \cdot \beta_{R1}(2k-1) \cdot x_{R1}(2k-1) + n_{R2}(2k)$ (receiving) |
| D (reveiving) | $y(2k-1) = h_{SD}(2k-1) \cdot x(2k-1) + \alpha_{2D} \cdot h_{2D}(2k-1) \cdot \beta_{R2}(2k-2) \cdot x_{R2}(2k-2) + n_D(2k-1)$ | $y(2k) = h_{SD}(2k) \cdot x(2k) + \alpha_{1D} \cdot h_{1D}(2k) \cdot \beta_{R1}(2k-1) \cdot x_{R1}(2k-1) + n_D(2k)$ |

After some manipulations, the final expression is given by Equation 15, as follows:

$$Y[k] = P \cdot Y[k-1] + Q \cdot X[k] + R \cdot X[k-1] + N_D + N_R \quad \text{(Eq. 15)}$$

where $$P = \begin{bmatrix} 0 & \dfrac{\alpha_{2D} \cdot \alpha_{12} \cdot \beta_{R2}(2k-2) \cdot h_{2D}(2k-1) \cdot h_{12}(2k-2)}{\alpha_{1D} \cdot h_{1D}(2k-2)} \\ 0 & \dfrac{\alpha_{1D} \cdot \alpha_{12} \cdot \alpha_{12} \cdot \beta_{R1}(2k-1) \cdot \beta_{R2}(2k-2) \cdot h_{12}(2k-2) \cdot h_{12}(2k-1) \cdot h_{1D}(2k)}{\alpha_{1D} \cdot h_{1D}(2k-2)} \end{bmatrix},$$

$$Q = \begin{bmatrix} h_{SD}(2k-1) & 0 \\ \alpha_{1D} \cdot \alpha_{S1} \cdot \beta_{R1}(2k-1) \cdot h_{S1}(2k-1) \cdot h_{1D}(2k) & h_{SD}(2k) \end{bmatrix},$$

$$R = \begin{bmatrix} 0 & \alpha_{2D} \cdot \beta_{R2}(2k-2) \cdot h_{2D}(2k-1) \cdot \left[ \alpha_{S2} \cdot h_{S2}(2k-2) \dfrac{\alpha_{12} \cdot h_{12}(2k-2) \cdot h_{SD}(2k-2)}{\alpha_{1D} \cdot h_{1D}(2k-2)} \right] \\ 0 & \begin{array}{l} [\alpha_{1D} \cdot \alpha_{12} \cdot \beta_{R1}(2k-1) \cdot \beta_{R2}(2k-2) \cdot h_{12}(2k-1) \cdot h_{1D}(2k)] \cdot \\ \left[ \alpha_{S2} \cdot h_{S2}(2k-2) \dfrac{\alpha_{12} \cdot h_{12}(2k-2) \cdot h_{SD}(2k-2)}{\alpha_{1D} \cdot h_{1D}(2k-2)} \right] \end{array} \end{bmatrix},$$

$$N_D = \tilde{n}_D[k] - \begin{bmatrix} 0 & \dfrac{\alpha_{2D} \cdot \alpha_{12} \cdot \beta_{R2}(2k-2) \cdot h_{2D}(2k-1) \cdot h_{12}(2k-2)}{\alpha_{1D} \cdot h_{1D}(2k-2)} \\ 0 & \dfrac{\alpha_{1D} \cdot \alpha_{12} \cdot \alpha_{12} \cdot \beta_{R1}(2k-1) \cdot \beta_{R2}(2k-2) \cdot h_{12}(2k-1) \cdot h_{12}(2k-2) \cdot h_{1D}(2k)}{\alpha_{1D} \cdot h_{1D}(2k-2)} \end{bmatrix} \cdot \tilde{n}_D[k-1],$$

and $$N_R = \begin{bmatrix} \alpha_{2D} \cdot \beta_{R2}(2k-2) \cdot h_{2D}(2k-1) & 0 \\ \alpha_{1D} \cdot \alpha_{12} \cdot \beta_{R1}(2k-1) \cdot \beta_{R2}(2k-2) \cdot h_{1D}(2k) \cdot h_{12}(2k-1) & \alpha_{1D} \cdot \beta_{R1}(2k-1) \cdot h_{1D}(2k) \end{bmatrix} \cdot \tilde{n}_R[k].$$

For DF mode of this system model, it can simply be obtained from the above AF mode according to conventional techniques, as described above.

Now, a linear MMSE decision feedback equalizer receiver may be used to detect the transmitted data symbols, for example, as defined in Equation 16

$$MMSE\_LE_i = R_x - (R_x^{-1} + H^H R_n^{-1} H)^{-1} H^H R_n^{-1} H R_x[i,i] \quad \text{(Eq. 16)}.$$

Consequently, the symmetrical cooperative relaying system 300 of the present application provides significant advantage by providing a balanced diversity gain to each received data symbol when two or more relays 330 and 340 are communicating information to each other. Therefore, the system 300 provide significantly improved performance over to conventional cooperative relaying, such as described above in the system 100 of FIG. 1.

Figure 5:
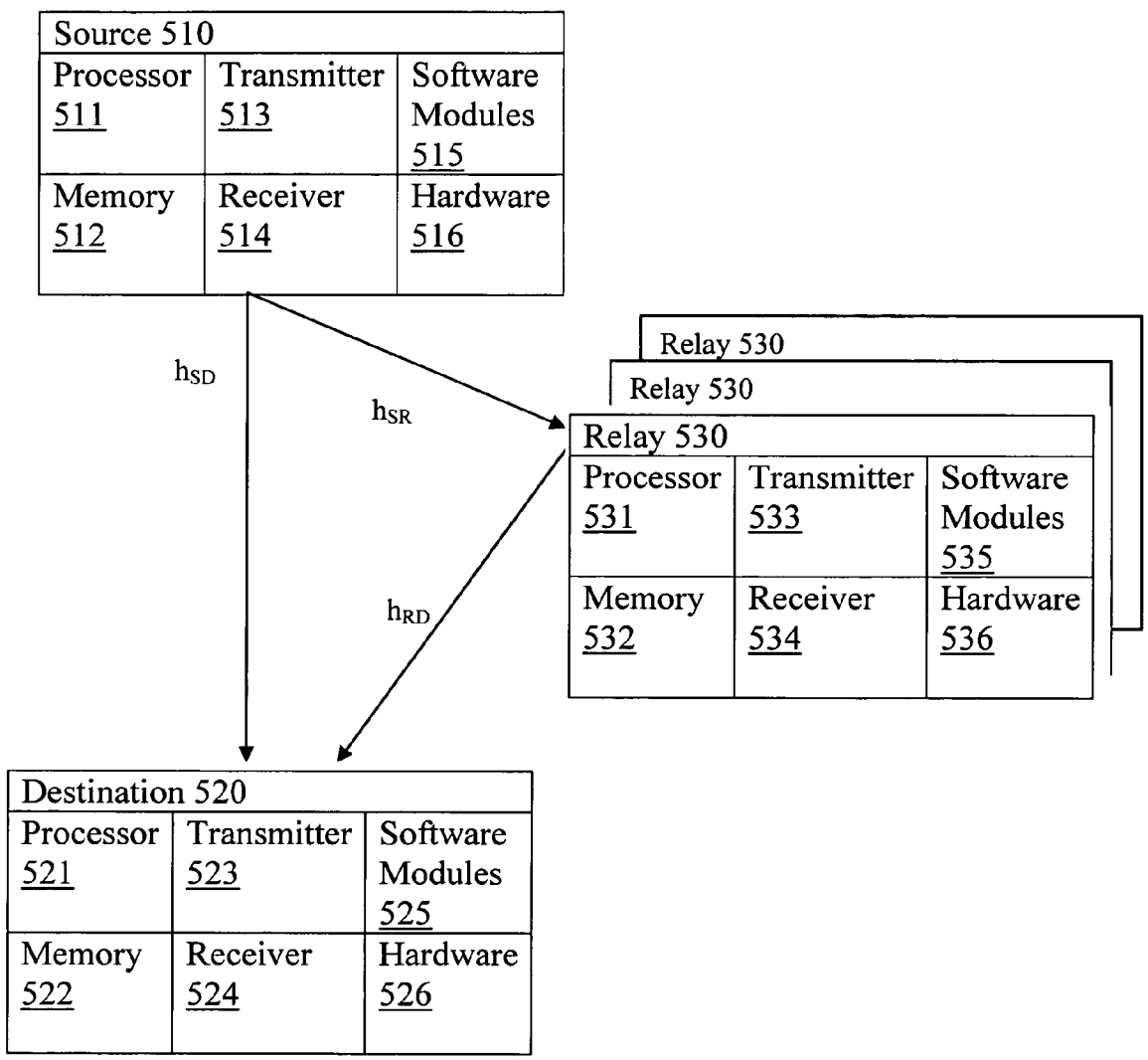
FIG. 5. is a high-level, schematic diagram that depicts components of a cooperative relaying system in accordance with embodiments of the present application.
Figure 7:
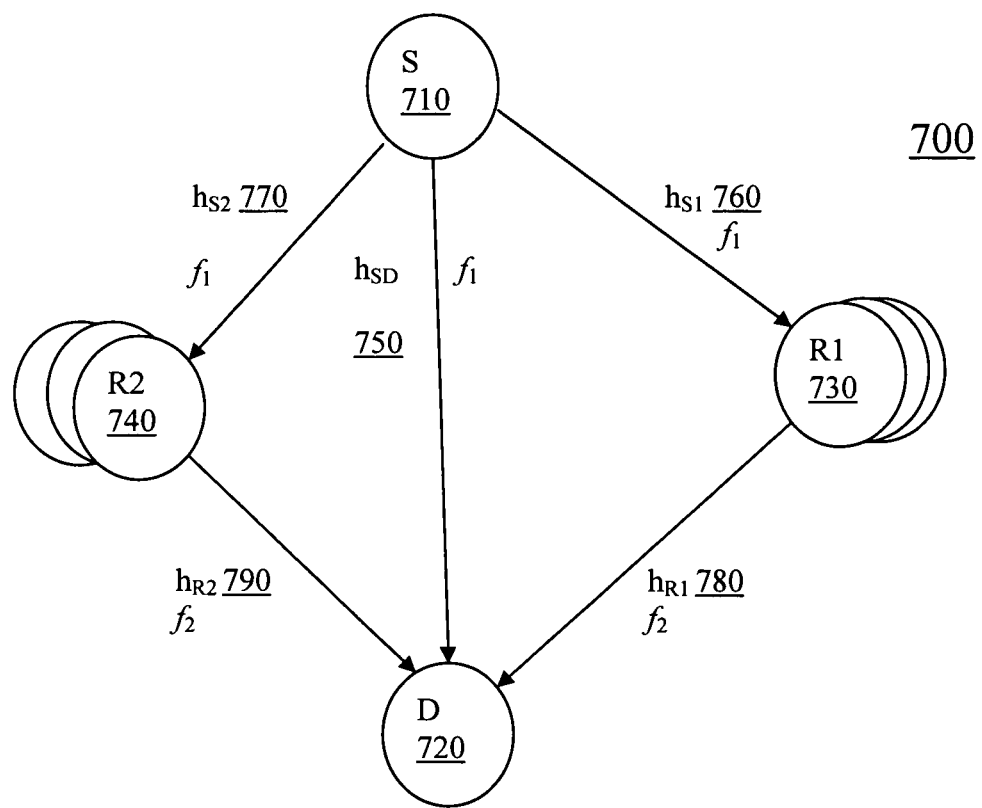
FIG. 7. is a high-level, schematic depiction of a cooperative relaying system in accordance with another embodiment of the present application.

A relay network 500 in accordance with embodiments of the present application, as presented in systems 300 and 700 of FIGS. 3 and 7, is presented in FIG. 5. In FIG. 5, a source 510 broadcasts a message, and this message is received by both a destination 520 and relays 530. The relays 530 may then retransmit the received message to the intended destination 520. If there is not enough dedicated relay stations 530 between the source and destination nodes, 510 and 520, a relay-enabled mobile station or a base station may act as a relay station.

As depicted in FIG. 5, the source 510 may include a processor 511, memory 512, and input and output devices 513-514. The source 510 may further include software 515 and related hardware 516 for performing the functions related to the broadcast of signals, as disclosed in the present application. For example, the source 510 may receive and store messages to be transmitted, access the memory and transmit the stored messages, and then remove the stored messages from memory after receiving confirmation that the transmitted message were received by the intended destination 520. Thus, the processing of the messages to be transmitted may be performed, as needed by circuitry in the hardware 516 or software 515.

Likewise, the destination 520 may include a processor 521, memory 522, and input and output devices 523-524. The destination 520 may further include software 525 and related hardware 526 for performing the functions related to the receiving and decoding of the broadcast of signals, as disclosed in the present application. For example, the destination node 520 may include the above described a linear MMSE decision feedback equalizer receiver implemented either as a decoder circuit in the hardware 526 or the software 525.

The relays 530 may also include a processor 521, memory 522, and input and output devices 523-524, as needed to receive and forward a message. The relays 530 may further include software 525 and related hardware 526 for performing the various functions related to the receiving and decoding of the broadcast of signals, as disclosed in the present application. For example, the relays may receive and store messages to be transmitted, and access the memory and transmit the stored messages. Thus, the processing of the messages to be transmitted may be performed, as needed by circuitry in the hardware 526 or software 525.

Figure 6:
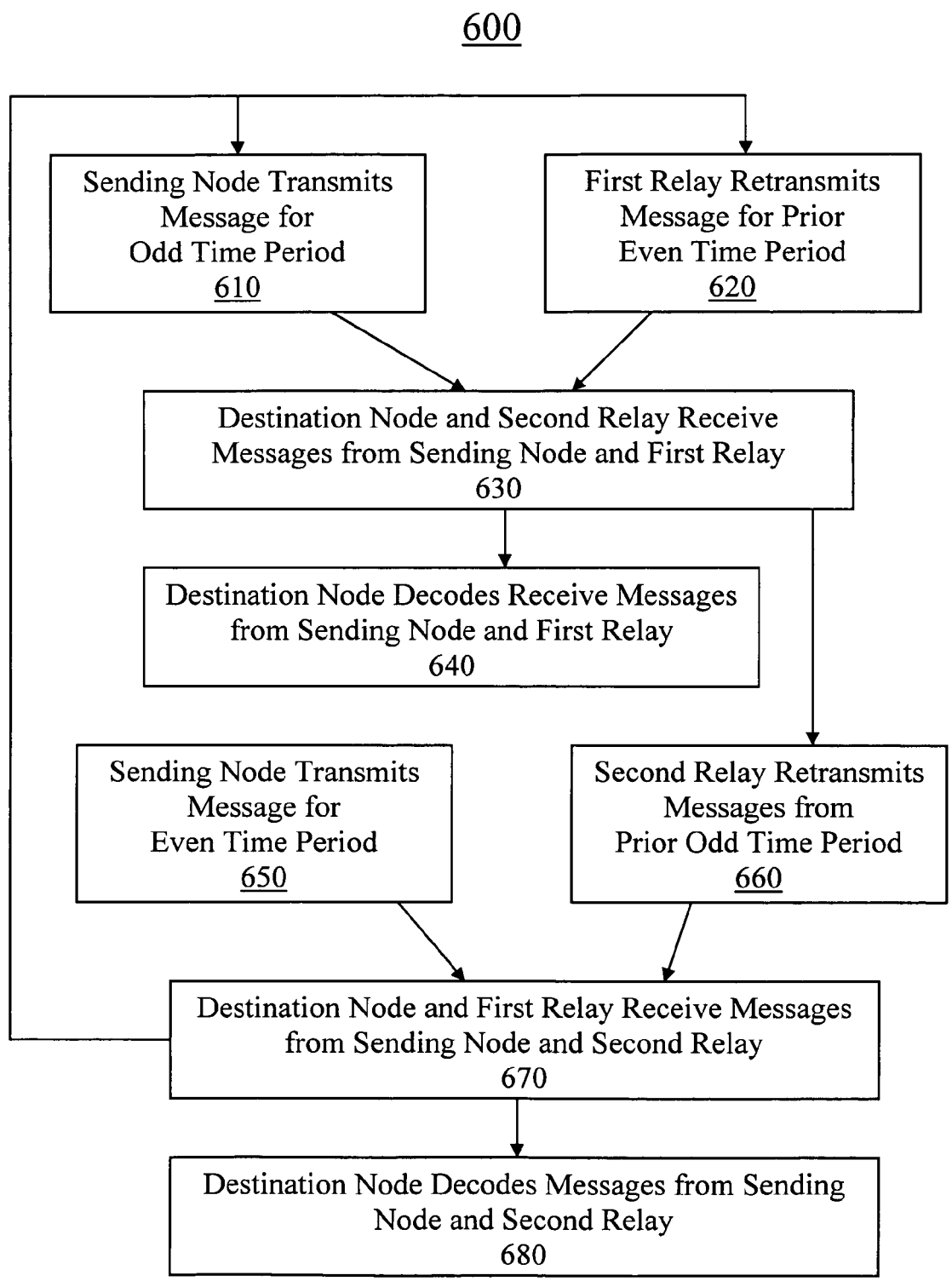
FIG. 6. a flow diagram that depicts the steps in a cooperative relaying method in accordance with embodiments of the present application, such as disclosed in FIGS. 3 and 4.

Referring now to FIG. 6, a cooperative relay method 600 in accordance with embodiments of the present application is presented. In a first time period (designated herein as an odd time period), the source node broadcasts a message symbol in step 610. In that same time period, a first relay node transmits a message received from a prior time period in step 620. A destination node and a second relay node, in step 630, receive the transmission from both the source node and the first relay node. The destination node then, in step 640, decodes the received messages from the source node and the first relay using, for example, the mathematical techniques described above.

Continuing with cooperative relay method 600 of FIG. 6, in a second time period (designated herein as an even time period), the source node broadcasts a message symbol in step 650, and the second relay node retransmits the message received during the prior time period in step 660. Both the destination node and the first relay, in step 670, receive the transmission from both the source node and the first relay node. The destination node then, in step 680, decodes the received messages from the source node and the second relay, again using the mathematical techniques described above.

Referring now to FIG. 7, a partial cooperation relaying system 700 in accordance with another embodiment also implemented by the use of two or more relays $R_1$ and $R_2$, respectively elements 730 and 740, to improve communications between a source node, or sender, 710 and a destination node 720. In the configuration of cooperative relaying system 700, there is no communication between the first relay node $R_1$, element 730, and the second relay node $R_2$, element 740. Instead, as described in greater detail below, this partial cooperation relaying system 700 is implemented using at least two different frequencies or other method for differentiating between transmissions, such as modification of transmission phase.

In a preferred implementation, the source S 710 transmits messages 750 to the destination node, and messages 760 and 770, respective, to the relay stations 730 and 740. The transmissions from the source node S 710 are in a first frequency band $f_1$, and the relay stations 730 and 740, respectively, receive the transmissions 760 and 770 from the source 710 in this $f_1$ frequency band. However, the relay stations 730 and 740 transmit messages 780 and 790 in a second frequency band $f_2$ that is distinct from the first frequency band $f_1$. In addition, the destination node D 720 receives and decodes both the message 750 in first frequency band $f_1$ and the message 780 and 790 in the second frequency band $f_2$. In particular, as described in greater detail below, the destination node D 720 generally decodes the first frequency band $f_1$ and the second frequency band $f_2$. using maximum ratio combining to obtain a macro-diversity gain.

Thus, as schematically depicted in the partial cooperation system 700 of FIG. 7, the two relay stations 730 and 740 do not communicate with each other since the relay stations 730 and 740 only broadcast messages 780 and 790 in the second frequency band $f_2$, but only listen to the messages 750 and 760 in the first frequency band $f_1$. As described below, the partial cooperation relaying system 700 enables full data rate transmission and symmetry diversity gain to each received data symbol.

Returning to FIG. 5, the source 510, in accordance with the embodiment of FIG. 7, may include a transmitter 513 that transmits in the first frequency band $f_1$. Similarly, the relay 530 includes the receiver 534 that listens in the first frequency band $f_1$ and the transmitter 533 that broadcast in the second frequency band $f_2$. Consequently, the corresponding destination node 520 includes the receiver 524 that listens in both the first frequency band $f_1$ and in the second frequency band $f_2$. Furthermore, the destination node processor 521 is configured to cooperate with either a software application 525 or a hardware 526 to process and decode the received signals in both the first frequency band $f_1$ and in the second frequency band $f_2$.

Continuing with FIG. 5, it should also be appreciated that the source, relay, and destination nodes 510, 520, and 530 may be similar devices in which the processors 511, 521, and 531 coordinate with the software 515, 525, 535 or hardware 516, 526, 536 to perform different function based upon the location of the nodes 510, 520, and 530 and the needs of the wireless network. For example, in communications between two nodes, relays 530 may initially assist traffic in one direction and later assist replay traffic in the opposite direction.

For AF mode, a mathematical expression of the system 700 with partial cooperation as depicted in FIG. 7 may be expressed by Equation 17:

$$Y[k] = Q \cdot X[k] + R \cdot X[k-1] + N_D + N_R, \quad \text{(Eq. 17)}$$

where $$Q = \begin{bmatrix} h_{SD}(2k-1) & 0 \\ \alpha_{1D} \cdot \alpha_{S1} \cdot \beta_{R1}(2k-1) \cdot h_{S1}(2k-1) \cdot h_{1D}(2k) & h_{SD}(2k) \end{bmatrix},$$

$$R = \begin{bmatrix} 0 & \alpha_{2D} \cdot \beta_{R2}(2k-2) \cdot h_{2D}(2k-1) \cdot [\alpha_{S2} \cdot h_{S2}(2k-2)] \\ 0 & 0 \end{bmatrix},$$

$$N_D = n_D[k], \text{ and}$$

$$N_R = \begin{bmatrix} \alpha_{2D} \cdot \beta_{R2}(2k-2) \cdot h_{2D}(2k-1) & 0 \\ 0 & \alpha_{1D} \cdot \beta_{R1}(2k-1) \cdot h_{1D}(2k) \end{bmatrix} \tilde{n}_R[k].$$

Again, the DF mode of this system model may be obtained from the above-AF mode through known techniques.

Continuing with FIG. 7, the destination node 720 may use a linear MMSE receiver to detect the transmitted data symbols as defined in Equation 18:

$$MMSE\_LE_i = R_x - (R_x^{-1} + H^H R_n^{-1} H)^{-1} H^H R_n^{-1} H R_x[i,i] \quad \text{(Eq. 18)}$$

Figure 8:
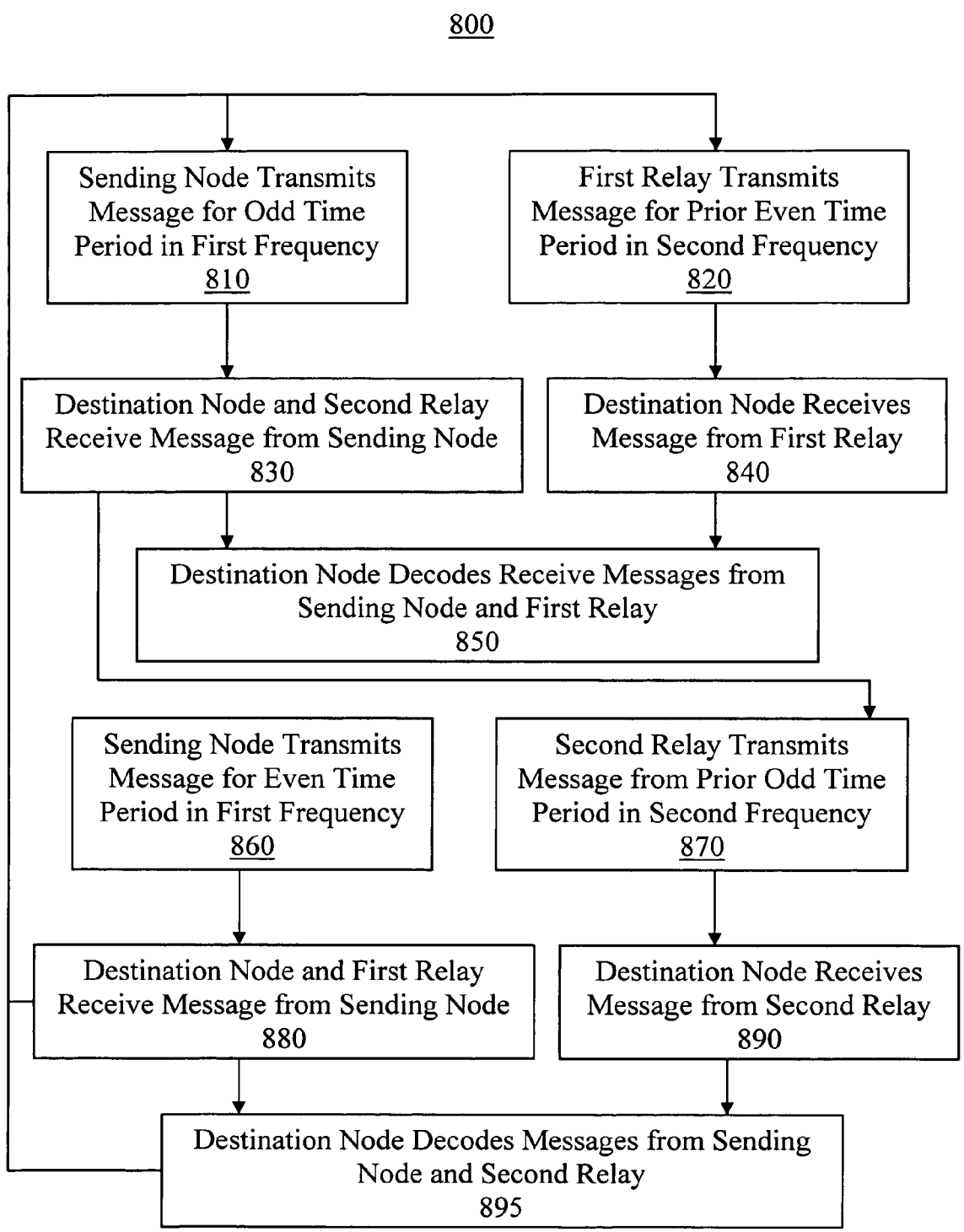
FIG. 8. is a process flow diagram that depicts the message transmission in the relaying system of FIG. 7

Referring now to FIG. 8, a partial cooperative relay method 800 in accordance with embodiments of the present application is presented. In a first time period (designated herein as an odd time period), the source node broadcasts a message symbol in a first frequency band, step 810. In that same time period, a first relay node transmits a message received from a prior time period in a second frequency, step 820. A destination node and a second relay node, in step 830, receive the transmission in the first frequency band from the source node. At the same time, the destination node, in step 840, receives the transmission in the second frequency band from the first relay node. The second relay node either cannot receive in the second frequency band or is configured to filter out or otherwise ignore transmissions in the second frequency band. The destination node then, in step 850, decodes the received messages from the source node and the first relay using, for example, the mathematical techniques described above.

Continuing with partial cooperative relay method 800 of FIG. 8, in a second time period (designated herein as an even time period), the source node broadcasts another message symbol in the first frequency band, step 860, and the second relay node retransmits, in the second frequency band, the message received during the prior time period in step 870. Both the destination node and the first relay, in step 880, receive the transmission from both the source node. The destination node, in step 890, also receives the retransmission from the first relay node. The destination node then, in step 895, decodes the received messages from the source node and the second relay in the even time period, again using the mathematical techniques described above. The process then repeats again with the source broadcasting a new message in step 810, and the first node in step 820 retransmitting the signal previously received in step 860.

Figure 9:
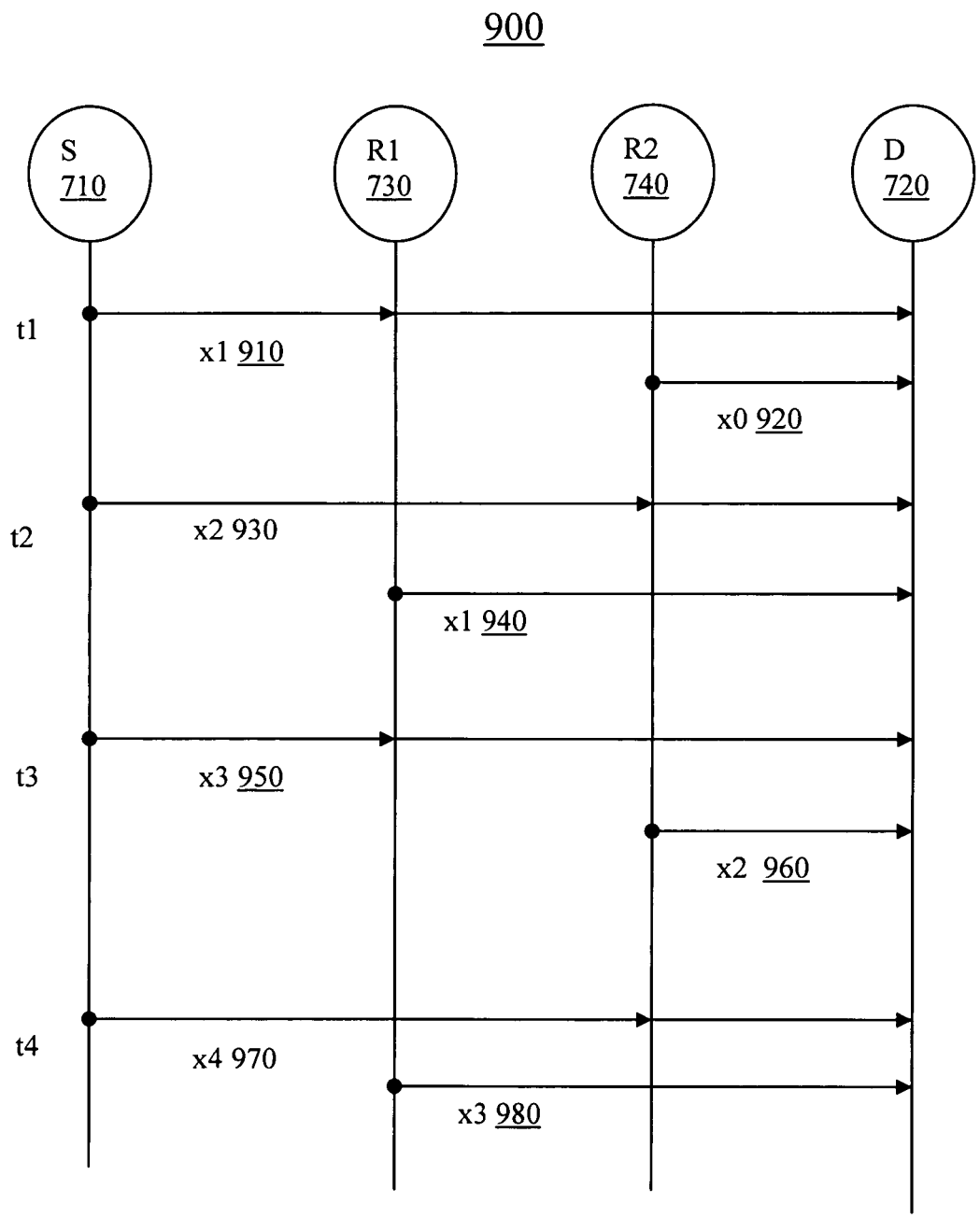
FIG. 9. a flow diagram that depicts the steps in a cooperative relaying method in accordance with another embodiment of the present application, such as disclosed in FIGS. 7 and 8.

Referring to FIG. 9, the source S 710 transmits the full rate data symbol in a first frequency band $f_1$ to the destination D 720, in transmission 910, 930, 950, and 970 that are associated with, respectively, time periods $t_1$, $t_2$, $t_3$, and $t_4$. Also at time $t_1$, the second relay $R_2$ 740 is transmitting, transmission 920, whatever ($x_0$) was received during the previous time epoch $t_0$ in a second frequency band $f_2$. In the first time period $t_1$, the first relay $R_1$ 730 is listening to the transmission 910 of $x_1$ from the source S 710 in the first frequency band $f_1$, and the destination D 720 also listens to the transmission 920 ($x_0$) from the second relay $R_2$ 740 in the second frequency band $f_2$.

Then, at second time $t_2$, the first relay $R_1$ 730 retransmits in the second frequency band $f_2$ the signals 910 ($x_1$) received during the previous time slot $t_2$, transmission 940, and the second relay $R_2$ also receives the transmission 930 ($x_2$) from the source S 710. This process similarly repeats during time periods $t_3$, $t_4$, and subsequent periods with transmissions 960 and 980 in which, respectively, the second relay $R_2$ 740 or the first relay $R_1$ 730 rebroadcasts second frequency band $f_2$ transmissions received from a prior time period to the destination node 720.

While the above description describes the first and second relay nodes as broadcasting in the same second frequency band $f_2$, it should be appreciated that these two nodes may also transmit in two different frequency modes, such that the transmissions from the relay nodes occur in a different frequency from the transmission from the source node. Alternatively, as described above, other known techniques such as code differences or phase differences may be used to differentiate the signals from the source node and the relay node.

Furthermore, it should be appreciated that while the present application refers to configurations with two relay nodes, the principles of the present application may be adapted for multiple relays. For example, as suggested in FIGS. 3 and 7, each of the first relays 330 and 730 and the second relays 340 and 740 may actually include multiple nodes that operate together to receive and transmit the messages as described in the present application. Alternatively, three or more relays may be used in the configurations of the present embodiments, For example, referring to FIG. 7, the partial cooperative relay system 700 may be adapted to include three relays, where first and second relays transmit in first and second frequency bands and a third relay node (not depicted) may transmit in a third frequency band. The third relay node may be used, for example, when the third frequency band is desired for a portion of a wireless network.

In another embodiment (not illustrated), the first and second relay nodes may be combined into a single component, such that a single node may perform both receiving and transmission related functions during each time period.

Figure 10:
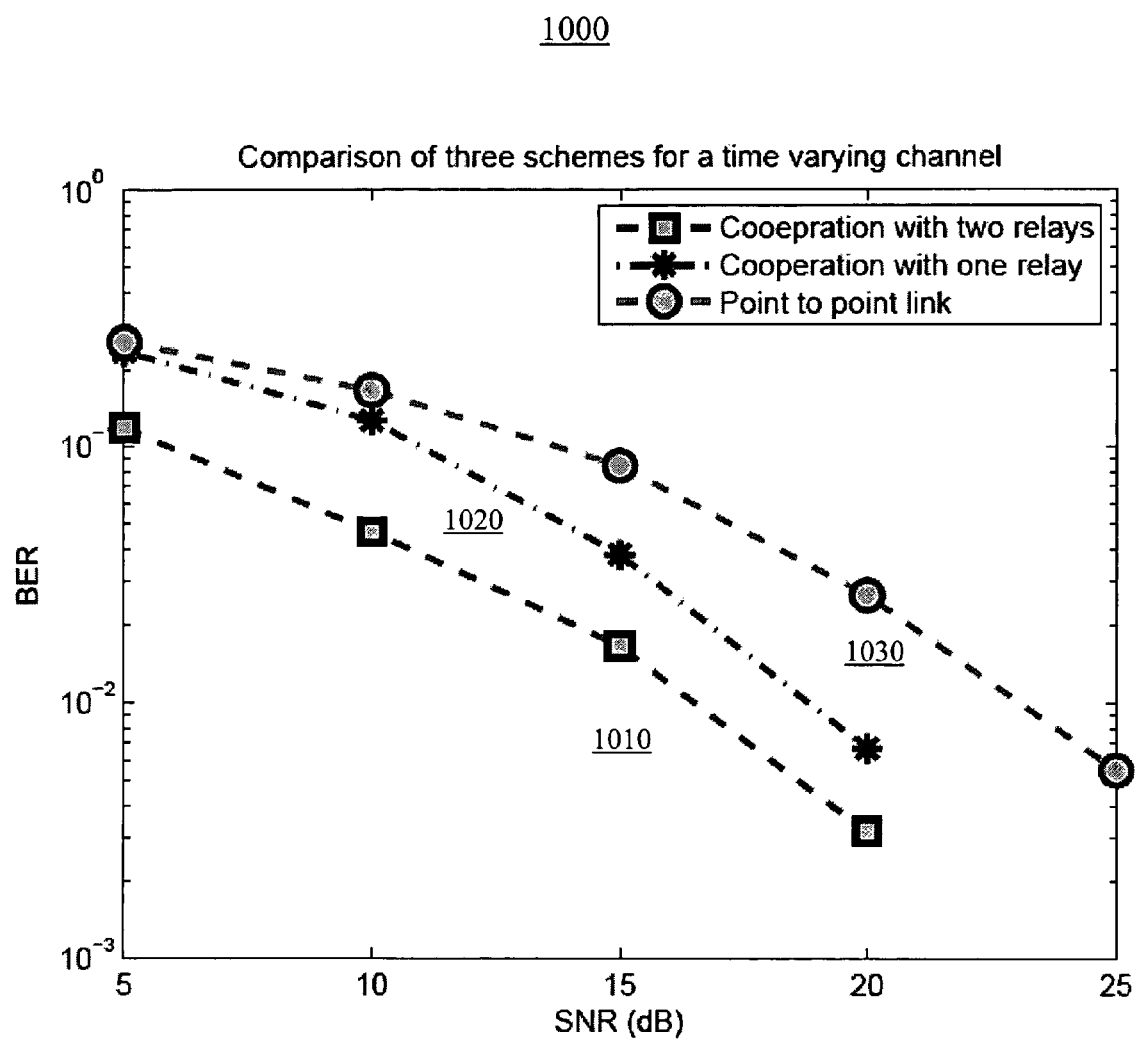
FIG. 10 is a chart the depicts a performance comparison of three scenarios of a system without a relay, a single relay network such as depicted in FIG. 1, and a cooperative relaying scheme with multiple relays such as depicted in FIG. 3 or 7.

Referring now to FIG. 10, chart 1000 gives the simulation results of different schemes that were simulated for detection by using a MMSE Linear Equalizer. In particular, FIG. 10 depicts curves 1010, 1020, and 1030 that compare a signal-to-noise ration (SNR) and bit error rate (BER) curves for three different systems for a time varying channel. In particular, curve 1010 corresponds to a point-to-point link that does not use a relay. Curve 1020 corresponds to a conventional relay system, such as depicted in FIG. 1. Curve 1030 corresponds to a cooperative relay system, such as disclosed in the present application in FIGS. 3 and 7. The channel coefficients change after every 1000 transmitted symbols. In FIG. 10, chart 1000 strongly suggests that the performance of system is best in the case of two or more relays, such as the cooperative relay systems 300 and 700 in FIGS. 3 and 7, and is relatively poor in the case of point-to-point link that does not use a relay.

In this way, embodiments of the present application disclose a cooperative relaying scheme. In one embodiment, cooperative relaying uses a full cooperation, and in a second embodiment, the disclosed configuration provides partial cooperation. In either embodiment, the schemes disclosed in the present application provide balanced diversity gain to each received data symbol. Therefore, the system performance is improved as compared to the conventional cooperative relaying, which is an unbalanced diversity system.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method for relaying transmissions between a source node and a destination node in wireless network, the method comprising:

receiving, in a first time period, a first broadcast comprising a first source transmission from the source node over a first frequency band and a first relay transmission from a first relay node over a second frequency band when a second relay node is not transmitting, wherein the first relay transmission comprises a prior source transmission received from the source node;

receiving, in a second time period, a second broadcast comprising a second source transmission from the source node and a second relay transmission from the second relay node when the first relay node is not transmitting, wherein the second relay transmission comprises the first source transmission, wherein the first relay node and the second relay node are configured to alternate with one another; and decoding said first and second broadcasts, wherein the first frequency band is different from the second frequency band, wherein the first and second source transmissions comprise the first frequency band, and the first relay and the second relay transmissions comprise the second frequency band, wherein the first relay node and the second relay node receive in the first frequency band, and wherein the first relay node and the second relay node transmit in the second frequency band.

2. The method of claim 1, wherein said decoding comprises using a linear minimum mean square error decision feedback equalizer receiver to detect transmitted data symbols.

3. The method of claim 1, wherein the second relay transmission further comprises the first relay transmission and the first source transmission.

4. The method of claim 3, further comprising:

receiving, in a third time period, a third broadcast comprising a third source transmission from the source node and a third relay transmission from the first relay node when the second relay node is not transmitting, wherein the third relay transmission comprises the second source transmission and the second relay transmission from a second relay node, wherein the decoding further comprises decoding the third broadcast.

5. A destination node for receiving relayed transmissions from source node, the destination node comprising:

a receiver configured to receive:

a first broadcast comprising a first source transmission from the source node over a first frequency band and a first relay transmission from a first relay node over a second frequency band when a second relay node is not transmitting, wherein the first relay transmission comprises a prior source transmission received from the source node, and a second broadcast comprising a second source transmission from the source node and a second relay transmission from the second relay node when the first relay node is not transmitting, wherein the second relay transmission comprises the first source transmission, wherein the first relay node and the second relay node are configured to alternate with one another; and a processor configured to decode said first and second broadcasts, wherein the first frequency band is different from the second frequency band, wherein the first and second source transmissions comprise the first frequency band, and the first relay and the second relay transmissions comprise the second frequency band, wherein the first relay node and the second relay node receive in the first frequency band, and wherein the first relay node and the second relay node transmit in the second frequency band.

6. The destination node of claim 5, wherein said processor comprises a linear minimum mean square error decision feedback equalizer receiver to detect transmitted data symbols.

7. The destination node of claim 5, wherein the receiver is further configured to receive a third broadcast comprising a third source transmission from the source node and a third relay transmission from the first relay node when the second relay node is not transmitting, wherein the third relay transmission comprises the second source transmission, and wherein processor is further configured to decode the third broadcast.

8. A method for relaying a message from a source node to a destination node, the method comprising:

receiving, in a first time instance, a first broadcast comprising a first source transmission from the source node over a first frequency band when a relay node is not transmitting; and transmitting, in a second time instance, a second relay transmission by the relay node over a second frequency band when a second relay node is not transmitting, wherein the second relay transmission comprises the first source transmission, wherein the destination node receives the first broadcast in the first time instance and a second broadcast in the second time instance, wherein the first broadcast comprises the first source transmission from the source node and a first relay transmission from the second relay node, wherein the first relay transmission comprises a prior source transmission received from the source node, and wherein the second broadcast comprises a second source transmission from the source node and the second relay transmission, wherein the relay node and the second relay node are configured to alternate with one another, wherein the first frequency band is different from the second frequency band, and wherein the first and second source transmissions comprise the first frequency band, and the first relay and the second relay transmissions comprise the second frequency band.

9. The method of claim 8, wherein said destination node comprises a linear minimum mean square error decision feedback equalizer receiver to detect transmitted data symbols.

10. The method of claim 8, wherein the second relay transmission further comprises the first source transmission and the first relay transmission.

11. The method of claim 10, wherein the destination node further receives a third broadcast comprising a third source transmission from the source node and a third relay transmission from a first relay node when the second relay node is not transmitting, wherein the third relay transmission comprises the second source transmission and the second relay transmission.

12. A relay node for relaying a message from a source node to a destination node, the relay node comprising:

a receiver configured to receive a first broadcast comprising a first source transmission from the source node over a first frequency band; and a transmitter configured to transmit a second relay transmission over a second frequency band when a second relay node is not transmitting, wherein the second relay transmission comprises the first source transmission, wherein the destination node receives a first broadcast and a second broadcast, wherein the first broadcast comprises the first source transmission from the source node and a first relay transmission from a second relay node, wherein the first relay transmission comprises a prior source transmission received from the source node, and wherein the second broadcast comprises a second source transmission from the source node and the second relay transmission, wherein the relay node and the second relay node are configured to alternate with one another, wherein the first frequency band is different from the second frequency band, and wherein the first and second source transmissions comprise the first frequency band, and the first relay and the second relay transmissions comprise the second frequency band.

13. The relay node of claim 12, wherein said destination node comprises a linear minimum mean square error decision feedback equalizer receiver to detect transmitted data symbols.

14. The relay node of claim 12, wherein the second relay transmission further comprises the first source transmission.

15. The relay node of claim 14, wherein the receiver is further configured to receive a third broadcast comprising a third source transmission from the source node and a third relay transmission from the second relay node, wherein the third relay transmission comprises the second source transmission.

16. A communications system comprising:

a first node configured to sequentially transmit a first source transmission and a second source transmission over a first frequency band;

a second node configured to transmit over a second frequency band a first relay transmission comprising a prior source transmission received from the first node;

a third node configured to transmit a second relay transmission comprising the first source transmission, wherein the second node and third node are configured to transmit alternately with respect to one another; and a fourth node configured to receive sequentially a first broadcast comprising the first source transmission and the first relay transmission, and a second broadcast comprising the second source transmission and the second relay transmission, wherein the second node and the third node are configured to alternate with one another, wherein the first frequency band is different from the second frequency band, wherein the first and second source transmissions comprise the first frequency band, and the first relay and the second relay transmissions comprise the second frequency band and wherein the second and third node are configured to listen to the first frequency band and to transmit in the second frequency band.

17. The system of claim 16, wherein the second relay transmission further comprises the first relay transmission.

18. A non-transitory computer readable medium for storing a program comprising computer readable instructions for implementing a method comprising:
   receiving a first source transmission from a source node over a first frequency band during a first time period, wherein a first relay transmission from a first relay node is also transmitted during the first time period when a second relay node is not transmitting; and
   transmitting from the second relay node a second relay transmission over a second frequency band during a second time period when the first relay node is not transmitting, wherein the second relay transmission comprises the first source transmission, and wherein the source node transmits a second source transmission during the second time period, wherein the first relay node and the second relay node are configured to alternate with one another, wherein the first frequency band is different from the second frequency band,
   wherein the first and second source transmissions comprise the first frequency band, and the first relay and the second relay transmissions comprise the second frequency band.

19. The non-transitory computer readable medium of claim 18, wherein the second relay transmission further comprises the first relay transmission.

\* \* \* \* \*